United States Patent
Woronowicz et al.

(10) Patent No.: US 9,038,796 B2
(45) Date of Patent: May 26, 2015

(54) POSITIONING AND/OR HOLDING A PLURALITY OF LINE SECTIONS OF ELECTRIC LINES ALONG A DRIVE WAY OF A VEHICLE

(75) Inventors: Konrad Woronowicz, Kingston (CA); Michael Baade, Frechen (DE); Kris Siedmiogrodzki, Amherstview (CA)

(73) Assignee: Bombardier Transportation GmbH, Berlin (DE)

( * ) Notice: Subject to any disclaimer, the term of this patent is extended or adjusted under 35 U.S.C. 154(b) by 264 days.

(21) Appl. No.: 13/516,022

(22) PCT Filed: Dec. 21, 2010

(86) PCT No.: PCT/EP2010/007989
§ 371 (c)(1),
(2), (4) Date: Jun. 14, 2012

(87) PCT Pub. No.: WO2011/076437
PCT Pub. Date: Jun. 30, 2011

(65) Prior Publication Data
US 2012/0318625 A1 Dec. 20, 2012

(30) Foreign Application Priority Data
Dec. 21, 2009 (GB) .................................. 0922465.0

(51) Int. Cl.
*B60M 1/14* (2006.01)
*B60M 1/34* (2006.01)
*B60L 5/00* (2006.01)
*E01B 21/00* (2006.01)

(52) U.S. Cl.
CPC . *B60M 1/34* (2013.01); *B60M 1/14* (2013.01); *B60L 5/005* (2013.01); *B60L 2270/34* (2013.01); *E01B 21/00* (2013.01); *B60L 2200/26* (2013.01)

(58) Field of Classification Search
USPC ... 191/1 R, 2, 12 R, 22 R, 22 C, 23 R; 238/2, 238/10 R, 10 B, 10 E, 10 F, 14.05, 14.3
See application file for complete search history.

(56) References Cited

U.S. PATENT DOCUMENTS

| | | | |
|---|---|---|---|
| 4,836,344 A | 6/1989 | Bolger | |
| 5,573,090 A | 11/1996 | Ross | |

(Continued)

FOREIGN PATENT DOCUMENTS

| | | | |
|---|---|---|---|
| CA | 2486558 A1 | 12/2003 | |
| CN | 1438948 A | 8/2003 | |

(Continued)

OTHER PUBLICATIONS

Chen et al.; "Inductive Power Transferring in Maglev Using Harmonic Injection Method"; Feb. 2004; IEEE; pp. 1165-1170.

*Primary Examiner* — R. J. McCarry, Jr.
(74) *Attorney, Agent, or Firm* — The Webb Law Firm

(57) ABSTRACT

A shaped block for positioning and/or holding a plurality of line sections of one or more electric lines along the track of a vehicle includes a plurality of recesses and/or projections. Edges of the recesses and/or the projections each delimit a space for the line sections into which one of the line sections can be introduced, so that said line section extends through the space in a longitudinal direction of the space. The longitudinal directions of the spaces delimited by the edges of the recesses and/or by the projections extend essentially mutually parallel in a common plane.

11 Claims, 4 Drawing Sheets

(56) References Cited

U.S. PATENT DOCUMENTS

| | | |
|---|---|---|
| 6,374,971 B1 | 4/2002 | Siciliano et al. |
| 2006/0157313 A1 | 7/2006 | Schirmeier et al. |
| 2008/0129246 A1 | 6/2008 | Morita et al. |

FOREIGN PATENT DOCUMENTS

| | | | |
|---|---|---|---|
| CN | 1659060 A | 8/2005 | |
| DE | 4115568 A1 | 2/1993 | |
| DE | 20002984 U1 | 8/2000 | |
| DE | 10037362 C1 | 12/2001 | |
| DE | 10346105 A1 | 4/2005 | |
| DE | 102007009367 * | 6/2007 | ............... H02G 3/30 |
| DE | 102007009367 A1 | 9/2007 | |
| EP | 0289868 A2 | 11/1988 | |
| GB | 2236957 A | 4/1991 | |
| JP | 3339162 B2 | 10/2002 | |
| WO | 9530556 A2 | 11/1995 | |
| WO | 2010031596 A2 | 3/2010 | |

* cited by examiner

POSITIONING AND/OR HOLDING A PLURALITY OF LINE SECTIONS OF ELECTRIC LINES ALONG A DRIVE WAY OF A VEHICLE

BACKGROUND OF THE INVENTION

1. Field of the Invention

The invention relates to positioning and/or holding a plurality of fine sections of one or more electric lines along a drive way of a vehicle. The vehicle can be, for example, a track-bound vehicle such as a railway vehicle. In the case of a railway vehicle, rails are provided on which the vehicle travels.

2. Description of Prior Art

Track-bound vehicles, in particular, such as conventional railway vehicles, monorail vehicles, trolleybuses and vehicles which are guided by other means along a track, for example, mechanical means other than rails, magnetic means, electronic means and/or optical means, require electrical energy for drive along the track and to power auxiliary equipment which does not produce drive of the vehicle. Such auxiliary equipment includes, for example, lighting systems, heating and/or air-conditioning systems, ventilation and passenger information systems. In general, the invention concerns the transfer of electrical energy to the vehicle, wherein the vehicle is not necessarily (but is preferably) a track-bound vehicle. Generally speaking, the vehicle may be, for example, a vehicle having an electrically operated drive motor. The vehicle may also be a vehicle having a hybrid drive system, e.g. a system which can be operated by electric energy or by other energy, such as electrochemically stored energy or fuel (e.g. natural gas, diesel fuel or petrol).

Track-bound vehicles, in particular vehicles for public passenger transport, usually comprise a contact element for mechanically and electrically contacting a conductor along the track, such as an electric rail or an overhead line. At least one drive motor on board the vehicle is fed with the electrical power from the external track or line end produces mechanical drive energy.

Trams and other local or regional trains are operated within cities, usually via overhead lines. However, especially in historic parts of cities, overhead lines are undesirable. On the other hand, conductor rails in the ground or near the ground cause safety problems.

WO 95130556 A2 describes a system wherein electric vehicles are supplied with energy from the roadway. The all-electric vehicle has one or more on-board energy storage elements or devices that can be rapidly charged or supplied with energy obtained from an electrical current, for example a network of electromechanical batteries. The energy storage elements may be charged while the vehicle is in operation. The charging occurs through a network of power coupling elements, e.g. coils, embedded in the track. Induction coils are located at passenger stops in order to increase passenger safety.

Arranging the coils at selected locations along the length of the path of travel has the disadvantage that the energy stores on board the vehicle need a large storage capacity. In addition, if the vehicle does not reach the next coil in time, the energy needed for drive or other purposes might run out. Therefore, at least for some applications, it is preferable to transfer energy to the vehicle continuously along the path of travel, i.e. along the track.

Inductively transferring energy from the track to the vehicle. i.e. producing electromagnetic fields, particularly alternating fields, is subject to restrictions regarding EMC (electromagnetic compatibility). Firstly, electromagnetic fields can interfere with other technical equipment. Secondly, people and animals should not be permanently exposed to electromagnetic fields. At least, the respective limit values for field intensity must be observed.

SUMMARY OF THE INVENTION it is an object of the present invention to provide a component, an arrangement and a method for positioning and/or holding a plurality of electric line sections which enable the transfer of electric energy to a vehicle, in particular to a track-bound vehicle, which allows for continuous transfer of electric energy during travel and which facilitates meeting the respective limits for EMC.

According to a basic concept of the present invention, energy is transferred from an arrangement of electrical conductors, which is arranged along the track, to the vehicle while the vehicle is travelling along the track. There is no electrical contact between the vehicle and the conductor arrangement. The conductor arrangement carries an alternating current which generates a corresponding alternating electromagnetic field and the electromagnetic field is used to transfer the electrical energy to the vehicle.

The arrangement of electrical conductors along the track can be realised in a variety of ways. For example, the conductor or lines can be cables laid in the ground as usual in road construction or underground engineering. The opening in the ground is then filled and provided with a suitable covering over which the vehicle can travel. For example, in the case of railways, the conductor arrangement can first be laid and then the track bedding for the rails can be made thereupon.

However, too large distance between the conductor arrangement and the vehicle has the disadvantage that the energy is transferred at a low level of efficiency. The closer the conductor arrangement is to a corresponding receiver on or in the vehicle, the better is the inductive coupling. A shaped block is therefore proposed with the help of which one or more electric lines can be positioned and/or held along the track of the vehicle. The shaped block has a plurality of recesses and/or projections, wherein edges of the recesses and/or the projections each delimit a space for the line sections into which one of the line sections can be introduced, so that the line section extends through the space in a longitudinal direction of the space. In other words, a plurality of spaces is defined by the form of the shaped block, said spaces having a longitudinal direction, wherein a line section extending in the longitudinal direction can be introduced into each of the spaces.

The form of the shaped block therefore defines at least how line sections will be laid. A plurality of the shaped blocks can therefore be made in serial production and arranged along the track. Subsequently, the electric fine or lines can be laid in the manner defined by the shaped blocks. Errors in the positioning of the line sections can therefore easily be avoided.

However, depending on the material from which it is made, the shaped block has other possible functions. In particular, the shaped block can be made from a material which is able to support the vehicle, so that the vehicle can travel over the shaped block integrated into the track. Concrete can be considered as a suitable material for this purpose.

Alternatively or additionally, the shaped block can be made from electrically insulating material, so that it serves a protective function against short-circuit and unintentional contacting by objects and persons. Again, concrete is a suitable material, as well as plastics with electrically insulating properties. For example, it is known from railway track construction to arrange components between the rails and above the anchoring of the rails for the purpose of sound damping. These components can be produced by appropriate shaping as shaped blocks according to the invention.

A shaped block should therefore not be understood exclusively as a component made from sold, essentially incompressible material. The shaped block can also be made from elastically deformable material. The shaped block can also have regions connected to one another and made from different materials. If concrete is used for the shaped block, the concrete is preferably free from reinforcement made from metal. Rather, concrete of a different type, for example, with fibre components (e.g. glass fibres) is preferred. Polymer concrete can also be used. Instead of concrete, grout can be used as material for the shaped block, which may be reinforced by fibres, such as glass fibres.

The lack of reinforcement made from metal prevents the occurrence of unintended interactions with the conductor arrangement or the reinforcement even shielding the alternating electromagnetic field from the region traversed by an inductive receiver of the vehicle when the vehicle travels along the route. However, it is also possible for the shaped block to comprise electrically conductive material in predetermined regions in order to achieve shielding of the surroundings against the alternating electromagnetic fields generated by the conductor arrangement in these regions. For example, a shaped block which is to be arranged beneath the track route in or on the ground can have such shielding in its lower region. The spaces for laying the electrical line or lines are then situated above the shielding. Alternatively or additionally, shielding of this type can also be integrated in the shaped block laterally of the spaces for laying the electric lines.

The shaped block is preferably cast, as is known per se from the manufacturing of pre-cast concrete or grout parts or plastics elements for building use. The spaces for accommodating the line sections can be made in the casting process and/or subsequently introduced into the shaped block. The spaces formed by the shaped block are preferably situated at the surface of the shaped block. The invention essentially also includes the case that the shaped block comprises at least one space which comprises a closed peripheral edge with the exception of an entry aperture and en exit aperture through which the electric line is fed, in order to position the line section in the space. However, the construction with the spaces formed on the upper surface to accommodate the line sections is preferred since the laying of the electric line or lines is simpler and it is also possible to exchange the electric line or the shaped block at a later time from above.

The spaces formed in the shaped block for accommodating the line sections serve to position and/or hold the line sections. In particular, if the dimensions of the spaces are matched with little play to the dimensions of the electric line to be laid, the tine section is precisely positioned by the form of the shaped block. The edges of the recess and/or the projections formed on the shaped block serve to hold the line sections if and to the extent that the laid electric line lies against the edges or the projections. At least a movement of the electric line and thus a change in the predetermined placement of the electric line is hindered or prevented with this type of mechanical contact.

According to a further feature of the shaped block, the longitudinal directions of the spaces bordered by the edges of the recesses and/or by the projections extend essentially parallel to one another in a common plane. It is preferred that this common plane essentially extends in horizontal direction under the drive way of the vehicle. In particular, the recesses may extend with their longitudinal directions essentially mutually parallel at the upper surface of the shaped block.

Deviations from an arrangement of the spaces oriented exactly parallel to one another are possible particularly if the shaped block is to be laid at a curve of the track of the vehicle. In this case, the longitudinal directions of mutually adjacent spaces can be oriented other than parallel, depending on their separation and the radius of curvature of the track. However, given a typically small mutual separation of the spaces (preferably at least 0.1 m and not more than 1 m) and the normally much larger radius of curvature of the tracks for vehicles, the longitudinal directions are approximately parallel.

The scope of the invention also includes an arrangement with the shaped block in one of the embodiments described in this description and also with the line sections which extend through the spaces. If the line sections are first sections of a continuous electric line which has no transitions to other electric lines during operation of the electric line, then the whole electric line belongs to the arrangement. Since the first line sections extend essentially mutually parallel in the spaces, the electric line also has other, second line sections which connect the first line sections. In a particularly preferred embodiment, which will be considered in greater detail based on the accompanying figures, the second line sections are situated alternately at opposing sides of the shaped block, so that the electric line follows a meandering path overall. The first line sections extend transversely to the direction of travel of the vehicle or the track and the second line sections extend approximately in the direction of travel.

The shaped block can optionally also comprise, with its form, pre-defined spaces for accommodating the second line sections. However, it is also possible that the second line sections lie on another object or hang free from the first line sections which they connect to one another.

As previously mentioned, the at least one electric line of the conductor arrangement preferably extends along the track or route in a meandering manner, i.e. sections of the electric line which extend in the direction of travel are followed. In the course of the conductor by sections which extend transversely to the direction of travel, etc. In the case of a multi-phase system with at least two electric lines, this preferably applies to all the electric fines.

The expression "meandering" used above covers both the laying of an electric line with smoothly curved transitions (having large radii of curvature) between straight electric line sections as well as configurations with sharp, angular transition regions between adjacent straight sections. The longest possible straight sections are preferable, since they generate homogeneous fields. In case of a standard railway for trams having a narrow gauge of 1000 mm, the radius of curvature of the curved transitions between straight electric line sections is preferably above or equal to 18 m. However, this is only an example. The basic principle of the shaped blocks according to the present invention can be applied to different types of railways and other vehicle paths.

The lengths of the shaped block in the direction of travel may be in the range of 80-100 cm, although other lengths are also possible. The width of the block is preferably slightly smaller than the distance between the rails, in case of a railway. In case of other types of vehicle tracks, the width is preferably at least half the width of the vehicles travelling on the track. The height of the shaped block depends on the size of the electric) line or lines end on the type of material of the black. The height should be sufficient to ensure mechanical mobility during construction and operation of the vehicles track.

Where, in this description, it is stated that line sections are introduced into the spaces fanned by the shaped block or are accommodated therein, this also includes the case that the line sections are entirely accommodated, so that an imaginary shell surface with planar or approximately planar surface segments which conned existing outer contours of the shaped block in the region of the spaces lying on the surface of the shaped block, also contains the line sections accommodated in the spaces. However, it is also possible for the cross-sections of the line sections not to be entirely accommodated in the spaces in this sense. In this case, particularly, a covering can also be provided which also has a apace for accommodating the line sections or has a plurality of such spaces. A covering of this type can be, in particular, a cover for covering the line sections extending through the spaces, in particular, on the upper side of the shaped block.

A plurality of shaped blocks can be arranged behind one another to be positioned along the drive way of the vehicle or along the track of the vehicle. In particular, the longitudinal directions of the spaces formed by the different shaped blocks for accommodating the line sections extend essentially parallel to one another, wherein the longitudinal directions extend transversely to the direction of travel of the vehicle. The mutually adjacent shaped blocks arranged directly behind one another can abut one another at end surfaces or have gaps. By this means, it can be defined by the shaped blocks over relatively long sections of the track how electric lines are to be laid.

The track can, in particular, be a railway track for railway vehicles. In this case, it is preferable if the shaped blocks arranged behind one another are arranged between the rails of the railway track so that the longitudinal directions of the spaces for accommodating the line sections extend in an essentially horizontal plane and transversely to the direction of the travel of the vehicle. The expression "essentially horizontal" should be understood here to mean that the longitudinal directions are not inclined substantially differently from any existing transverse inclination of the railway track, e.g. in a curve of the railway track.

The railway track can be configured in any per no known manner in order to position and hold the rails. For example, sleepers such as concrete sleepers which extend transversely to the direction of travel and to which rails extending in the direction of travel are fastened can be provided. However, as also per se known, the rails can also be fastened to a concrete platform which is continuous in the direction of travel, or intermediate spaces between fastening sites of the rails can be filled with concrete or another material of stable form or elastomer. Particularly in inner city areas, the rails can also be set into the ground so that only the usual recesses which are necessary for the engagement of the wheels of the railway vehicle remain in the ground. In all cases, it is preferable that the spaces for accommodating the line sections are arranged only a few centimeters below the height level of the upper edge of the rails. In particular, the lower edge of the spaces for accommodating the fine sections which are defined by the material of the shaped block or blocks is located only a maximum of 10 cm, and preferably only a maximum of 5 cm, below the height level of the upper edge of the rails. By this means a very good inductive coupling is enabled between the conductor arrangement at the track and the receiver an or in the vehicle. For example, the distance between the electric line or lines in the track and the receiver of the vehicle is less than 10 cm and is preferably not greater than 7.5 cm if the receiver is situated an the underside of the railway vehicle.

If the railway has sleepers as mentioned above or has a continuous concrete platform to which the rails are fastened, the shaped blocks are preferably laid on the upper surfaces of the sleepers or the concrete platform. For example, a shaped block extends in the demotion of travel approximately from the centre of a sleeper to the centre of the following sleeper, i.e. it bridges the intermediate space between two sleepers.

It is not only in the case of a railway track that the shaped blocks arranged behind one another in the direction of travel can be linked to one another to secure said blocks against unintended slipping or displacement. For example, in the region of their and surfaces facing forwards and backwards in the direction of travel, the shaped blocks have means for engaging each other. For example, in the end surface of the shaped block which extends approximately transverse to the direction of travel in vertical and horizontal direction, a recess is provided into which a protruding element can be inserted, wherein the protruding element is also inserted into a similar recess in the adjacent shaped block and mutually fastens the two shaped blocks arranged behind one another, with or without clamping forces (e.g. by tensioning a screw or nut). Alternatively or additionally, the covers described below can be connected to one another in a manner described for the shaped blocks. Alternatively to the protruding element being a separate part, one of the adjacent shaped blocks may comprise the protruding element as an integral part at the end surface.

In particular, the at least one shaped block may comprise an end surface for facing in a direction of travel of the vehicle, wherein the end surface comprises a central region and wherein the end surface—if viewed from above—retreatingly extends on both sides of the central region, so that a further shaped block having a plane or retreatingly extending end surface may abut on the end surface oriented in different directions. As mentioned above, the so celled "end surface" may extend in vertical and horizontal direction. "Retreatingly extending" means that there are relative orientations of the shaped block and the adjacent shaped block wherein only the central region of the end surface abuts on the adjacent block. If viewed from above, the outline of the end surface may be straight or curved on both sides of the central region. Preferably, the end surfaces of both adjacent shaped blocks are shaped having retreatingly extending sides.

Such retreatingly extending end surfaces have the advantage that the adjacent blocks can be oriented relative to each other at different angels, while they abut on each other in the central region of the end surfaces. This means that shaped blocks can be laid along curved track sections with varying radii. For example, the blocks may have a length in the direction of travel of the vehicle in the range of 80-100 cm. In this case, the retreatingly extending sides of the end surfaces (if viewed from above) may have a straight outline which extends at an angle of 2.5°-3° relative to a straight line which extends perpendicularly to the direction of travel. Of course, blocks having such a retreating shape of the end surface can also be arranged adjacent to each other so that they follow a straight path of travel of the vehicle.

In particular, a first shaped block comprises a protrusion in the central region of the end surface, wherein a second shaped block comprises a recess in the central region of an abutting end surface, wherein the protrusion and the recess are correspondingly shaped and arranged so that the protrusion engages the recess in a manner which allows for a variation of the relative orientation of the first and second shaped block. Preferably, the protrusion and the recess—if viewed from above—comprise a curved outline.

If covers are placed over the shaped blocks arranged along the track, this serves, in particular, to protect the shaped blocks and the electric line(s) laid therein or thereon against influences such as unintended trampling by persons, damage during building works or during the laying of the lines, and against the weather. It should, in particular, be avoided that water can enter from above into the spaces for accommodating the line sections and freeze therein. Preferably, the covers can therefore configured to be broader than the spaces to accommodate the line sections extending transversely to the direction of travel. The covers can therefore extend laterally over the edges of the shaped blocks, providing particularly effective protection.

Alternatively or additionally, the covers can comprise downwardly projecting edges. These edges can extend at least to the height level of the lower edge of the spaces for accommodating the fine sections and thus also protect the electrical lines or line sections laid in the spaces against influences from the side.

As described above, covers arranged behind one another in the direction of travel can be mutually connected. Apart from enhancing the mechanical stability and protecting against displacement, this also serves to protect against theft of the electric lines.

The invention also relates to a method for positioning and/or holding a plurality of line sections of one or more electric lines along a track of a vehicle, wherein
- at least one shaped block having a plurality of recesses and/or projections is provided, wherein edges of the recesses and/or the projections each delimit a space for the line sections into which one of the line sections can be introduced, so that said line section extends through the space in a longitudinal direction of the space, and wherein the longitudinal directions of the spaces delimited by the edges of the recesses and/or by the projections extend essentially mutually parallel in a common plane,
- at least one electric tine is introduced into the spaces such that the tine sections of the line extend through the spaces in the longitudinal direction.

Preferably, the electric tine or lines are introduced into the spaces such that at least some of the line sections are parts of a continuous electric line, so that first line sections extending through the spaces in the longitudinal direction are connected to one another via other, second line sections of the electric line, wherein the second line sections extend alternately on opposite skies of the shaped block, so that the electric line follows a meandering path.

According to a preferred embodiment, the shaped black comprises an end surface for facing in a direction of travel of the vehicle, wherein the end surface comprises a central region and wherein the end surface—if viewed from above—retreatingly extends on both sides of the central region and wherein a further shaped block having a plane or retreatingly extending end surface is oriented in a desired direction—corresponding to the path of travel of the vehicle—while the end surfaces of the shaped block and of the further shaped block abutting on each other.

The shaped block may comprise a protrusion in the central region of the end surface, wherein the further shaped block comprises a recess in the central region of an abutting end surface, wherein the protrusion and the recess are correspondingly shaped and wherein the shaped block and the further shaped block are arranged so that the protrusion engages the recess in a manner which allows for a variation of the relative orientation of the first and second shaped block.

Developments and other embodiments of the method are disclosed in the description of the arrangement according to the invention, i.e. the description of a feature of the arrangement means that the arrangement can be made in corresponding manner.

An alternating voltage of any desired frequency can be applied to the conductor arrangement which is laid with the aid of the shaped blocks according to the invention along the track of the vehicle. However, it is preferred that the frequency is greater than 100 Hz. A well suited frequency range is the range between 1 and 100 kHz, e.g. between 10 and 30 kHz. As disclosed, in principle, in WO 95/30556 A2, the vehicle which is travelling on the track may comprise at least one coil. The alternating electromagnetic field generated by the alternating voltage and applied to the conductor arrangement generates an alternating voltage in the call which can be used to operate any electric load in the vehicle, such as a drive motor. Alternatively or additionally, the alternating voltage can be used to charge an energy storage system, such as conventional batteries and/or supercapacitors.

As previously stated, the electric conductor arrangement comprises at least one of the lines mentioned above. Preferably, it comprises at least two of these lines, wherein each line is configured or operated to carry one phase of a multi-phase alternating current. In practice, it is preferred that the electric conductor arrangement comprises three lines and that each line is configured to carry one of the three-phases of a three-phase alternating current. However, it is also possible, that the alternating current has more than three phases, so that a corresponding number of electric lines is present as part of the conductor arrangement. The magnetic poles produced by the lines and/or the sections of the different fines form—at each point in time—a repeating sequence extending in the (erection of travel, wherein the repeating sequence corresponds to the sequence of the phases. For example, in the case of a three-phase alternating current, having the phases U, V, W, a section carrying phase U is followed by a section carrying phase V which in turn is followed by a section carrying phase W. The sequence of phases U, V, W is repeated several times in the direction of travel. An example is described below in the description of the drawings.

The sections of the conductor arrangement arranged behind one another (with respect to the direction of travel), which sections extend transversely to the direction of travel have the advantage that the resulting electromagnetic fields sideways of the conductor arrangement (i.e. sideways of the track) compensate each other even at small distances to the conductor arrangement limit values for the EMC problem can therefore easily be met, despite power transfer at high levels. For this reason, it is advantageous if the line sections extending transversely to the direction of travel extend in an approximately horizontal plane. However, a slight inclination of the line sections relative to the horizontal plane, e.g. in curve regions of the track does not lead to significantly greater field strengths laterally to the track. The same applies if the track rises or falls, for example, in a hilly landscape.

The electric line or lines can be implemented with externally insulated electric cables, for example, stranded conductor cables. The cross-sectional area of the electrically conducting part of the cable lines, for example, in the range of 80 $mm^2$ to 200 $mm^2$. Depending on the power or current, however, other cross-sections can also be chosen. It is also possible to lay two or more cables parallel and directly adjacent to one another to conduct the same phase of the alternating current.

BRIEF DESCRIPTION OF THE DRAWINGS

Embodiments of the invention will now be described with reference to the accompanying figures. In which.

DETAILED DESCRIPTION OF THE INVENTION

Figure 1:
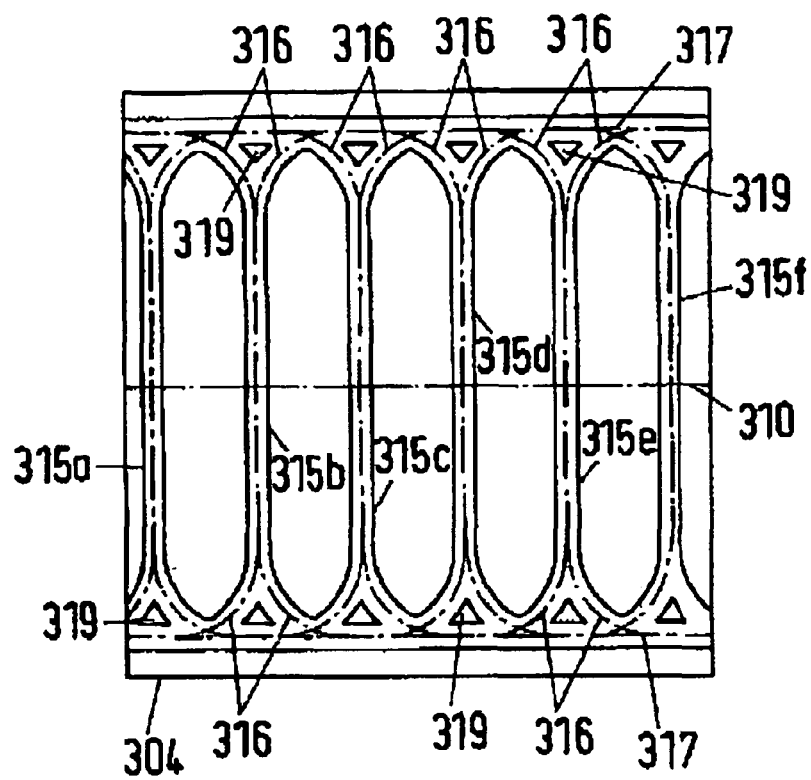
FIG. 1 shows a top view or a shaped block.

FIG. 1 shows a top view of a shaped block. The block 304 comprises six recesses 315a-315f which extend perpendicularly to a centre line 310 which divides the block 304 in two halves. The centre line 310 extends in the direction of travel of a vehicle, if the block 304 forms parts of a track for the vehicle.

The recesses 315 are parallel to each other and are arranged within the same horizontal plane which is parallel to the plane of FIG. 1. The recesses 315 extend in width direction (the vertical direction in FIG. 1) over about three quarters of the total width of block 304. They are arranged symmetrically to the centre line 310.

Each recess has a U-shaped cross section to receive a cable. The dashed knee shown in FIG. 1 which extend along the recesses 315 are centre lines of the recesses 315. At each of the two opposite ends of the straight recesses 315, there a bifurcated curved recess region 316 which forms a transition to a peripheral straight recess 317 extending along the lateral edge of the block 304. Cables can be laid in a manner consecutively extending from the straight recesses 315 through the curved recess region 316 into the peripheral straight recess 317, thereby changing the direction of extension from perpendicular to the direction of travel to parallel to the direction of travel.

The curved recess regions 315 allow for piecing a cable, which extends through the recess 315, in such a manner that it continues to either the left or the right, if viewed in the straight direction of the recess 315. For example, a cable (not shown in FIG. 1) may extend through recess 315b, may turn to the right—while extending through recess region 316—and may then extend through the straight recess 317 which extends perpendicularly to the recesses 315 on the opposite side of curved recess region 318. There are two peripheral straight recess regions 317 on opposite sides of block 304. The cable may then turn to the right through the recess region 316 at the end of recess 315e and may then extend through recess 315e. At the end of recess 315e, which is shown in the lower part of FIG. 1, the cable may again turn left through recess region 316 into the other straight recess 317. The other recesses 315 may be used for two other cables.

Figure 2:
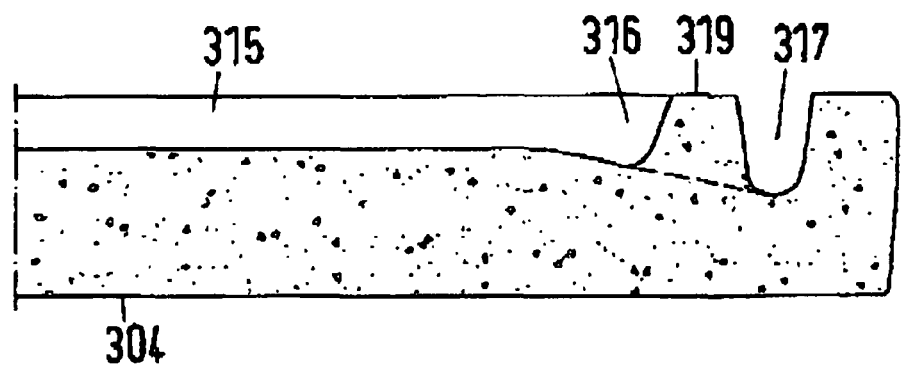
FIG. 2 shows a vertical cross-section through half of the block of FIG. 1.

As shown in FIG. 2, the depth of the recesses 315, 316, 317 is different. The depth of recess 315 is sufficient to receive one cable. The depth of the curved recess region 316 increases from the end of recess 315 to recess 317 as indicated by a dashed line in FIG. 2. The bottom profile of the curved recess region 316 is not fully shown in FIG. 2, since the sectional view inductee a region 319 of block 304 which is not recessed. Each of the curved recess regions 316 comprises such an island region 319 which is located between the two curved branches of the curved recess region 316. One of the branches extends above the plane of FIG. 2 and the other branch extends below the plane of FIG. 2. In addition, the island region 319 is located between the straight recess 317 and the two branches of the curved recess region 316.

Since the depth of the curved recess region 316 increases towards the straight recess 317, different cables can be laid upon one another. The depth of the straight recess 317 is sufficient to arrange two cables upon one another extending in the same straight direction. For example, a first cable may extend trough the lower recess 317 in FIG. 1 and may turn left into recess 315b through the recess region 316 shown in the bottom left pert of FIG. 1. In addition, a second cable may extend trough recess 315a, may turn into the recess 317, thereby crossing (if viewed from above) the first cable.

The example concerning the extension of cables or electric lines given above refers to one specific application for laying three meandering cables. However, the use of the shaped block 304 shown in FIGS. 1 and 2 is not restricted to this application. Rather, for example, less or more than three cables can be laid using the block 304 shown, in FIGS. 1 and 2.

Figure 3:
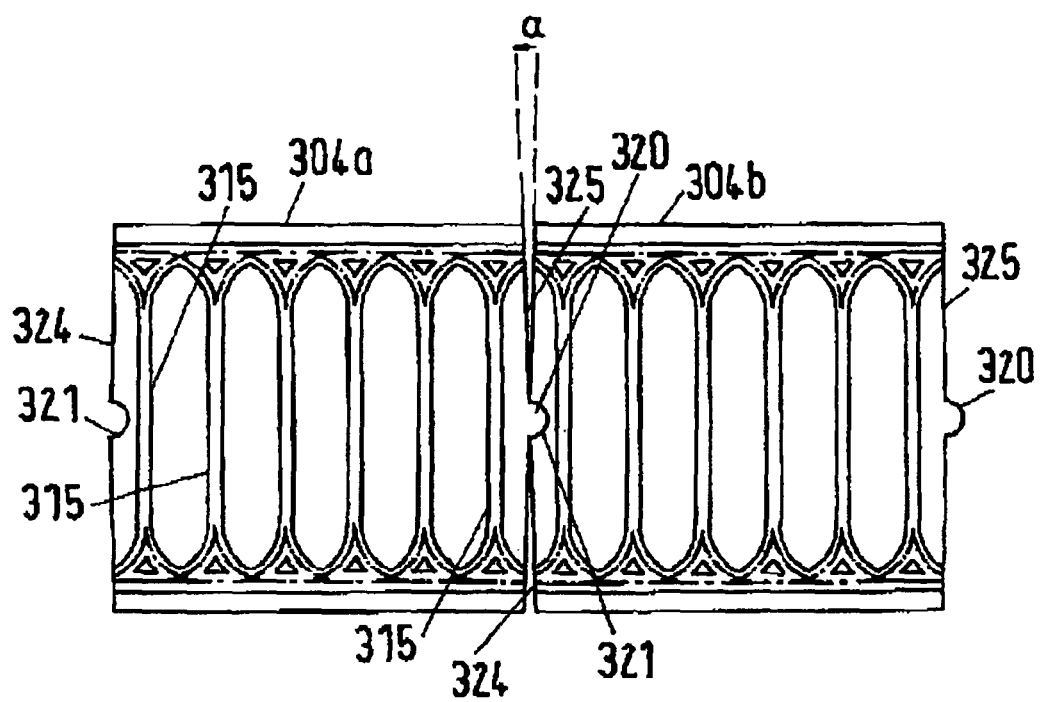
FIG. 3 shows a top view of a first arrangement of two blocks according to FIGS. 1 and 2.

FIG. 3 shows two blocks of the type shown in FIGS. 1 and 2. The blocks 304a, 304b are adjacent to each other, forming a continuous or nearly continuous path of recesses for receiving electric lines. The two blocks 304 may extend in the direction of travel together with further consecutive blocks not shown in FIGS. 3 and 4. The direction of travel is parallel to the dashed line extending from left to right in FIGS. 3 and 4.

Figure 4:
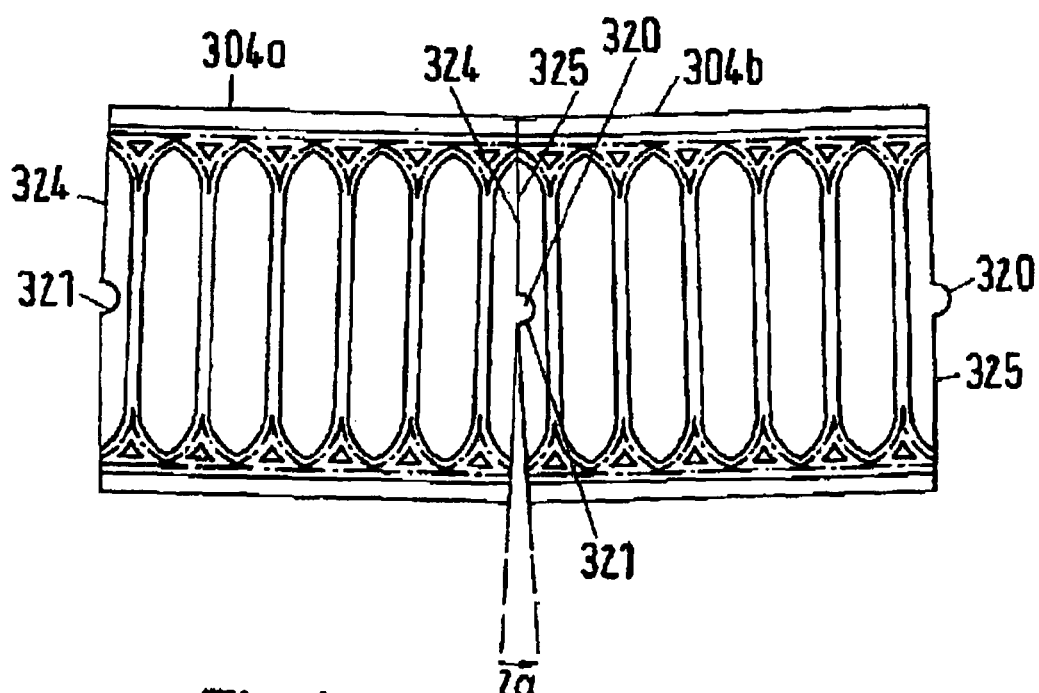
FIG. 4 shows a top view of a second arrangement of two blocks according to FIGS. 1 and 2.

Each of the blocks 304e, 304b comprises end surfaces facing in the direction of travel. The end surfaces facing to the right in FIGS. 3 and 4 are denoted by 325. The end surfaces which are facing to the opposite side are denoted by 324. All end surfaces 324, 325 extend from their central region to the opposite side of the block 304 in a retreating manner. "Retreating" means that the end surface as a whole does not extend within a single plane. Rather, the parts on opposite side of the centre line of the block 304 are ether curved or extend along planes which are aligned at an angle relative to each other.

According to the arrangement shown in FIG. 3, the two blocks 304a, 304b are aligned so that their centre lines are forming a common straight line. This arrangement corresponds to a straight track of a vehicle. According to the arrangement shown in FIG. 4, the centre lines are angled relative to each other which correspond to a curved track. Because of the retreating extension of the end surface 324, 325 which abut an each other at the interface of the blocks 304e, 304b the abutting surfaces 324, 325 include an angle which is denoted by α. In contrast, according to the arrangement shown in FIG. 4, the end surfaces 324, 325 are in full contact with each other on one side of the centre fine (the top side in FIG. 4) and include an angle of two times the angle of FIG. 3 on the opposite side of the centre line. Other angles between 2 tunes α and −2 times α can also be achieved by using the blocks 304a, 304b.

Within their central region, the end surfaces 325 comprise a protrusion 320 which is semi-circularly shaped. The end surfaces 324 comprise a correspondingly shaped semi-circular recess 321. As shown in FIGS. 3 and 4, the protrusion 320 fully engages the recess 321. Because of the curved outline of the protrusion 320 and of the recess 321, the relative orientation of the adjacent blocks 304a, 304b can be adapted within the limits given by the retreating configuration of the end surfaces 324, 325.

Figure 5:
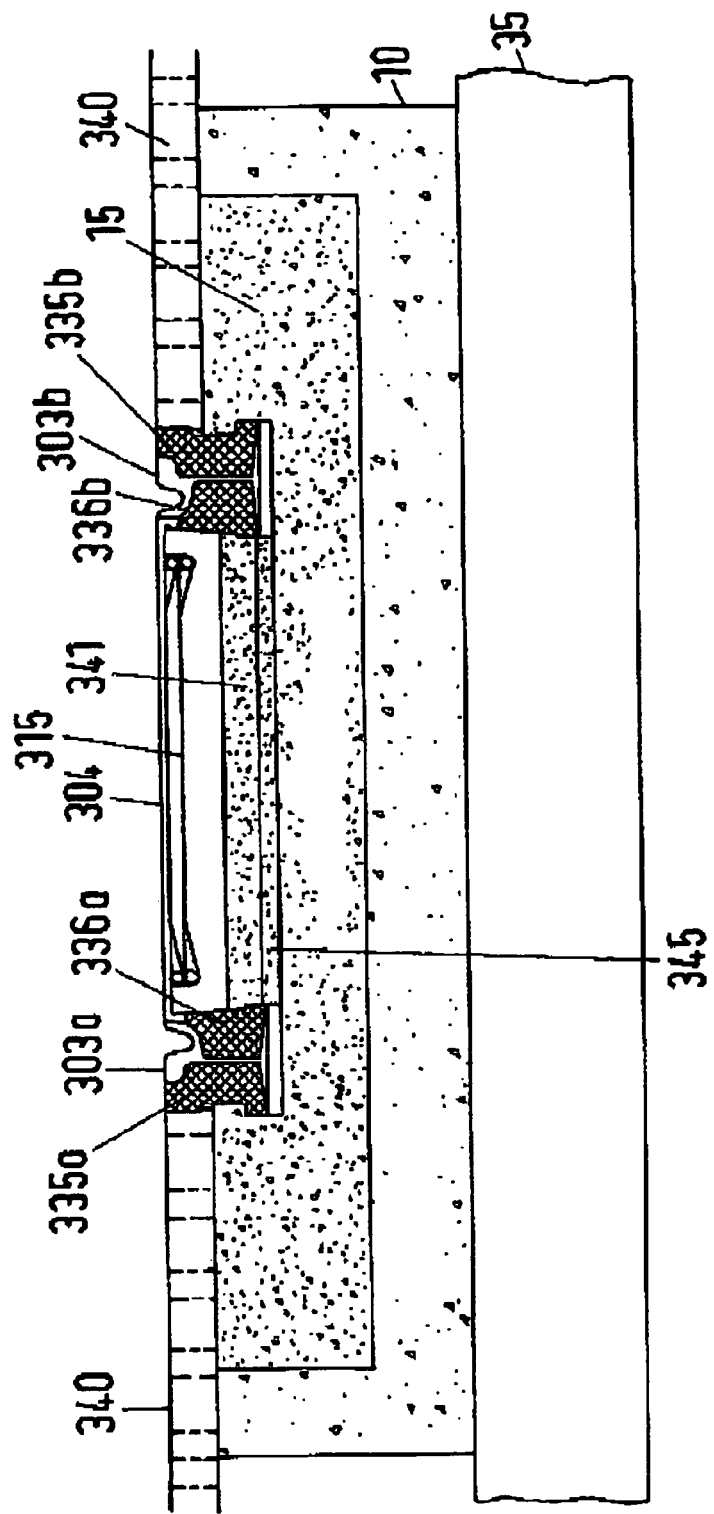
FIG. 5 shows a vertical cross-section through a railway track construction, including a shaped block

FIG. 5 shows a cross section through the construction of a track for a rail vehicle. The two parallely extending rails are denoted by 303a, 303b. In between the rails 303, a block 304 is placed for receiving cables.

Figure 6:
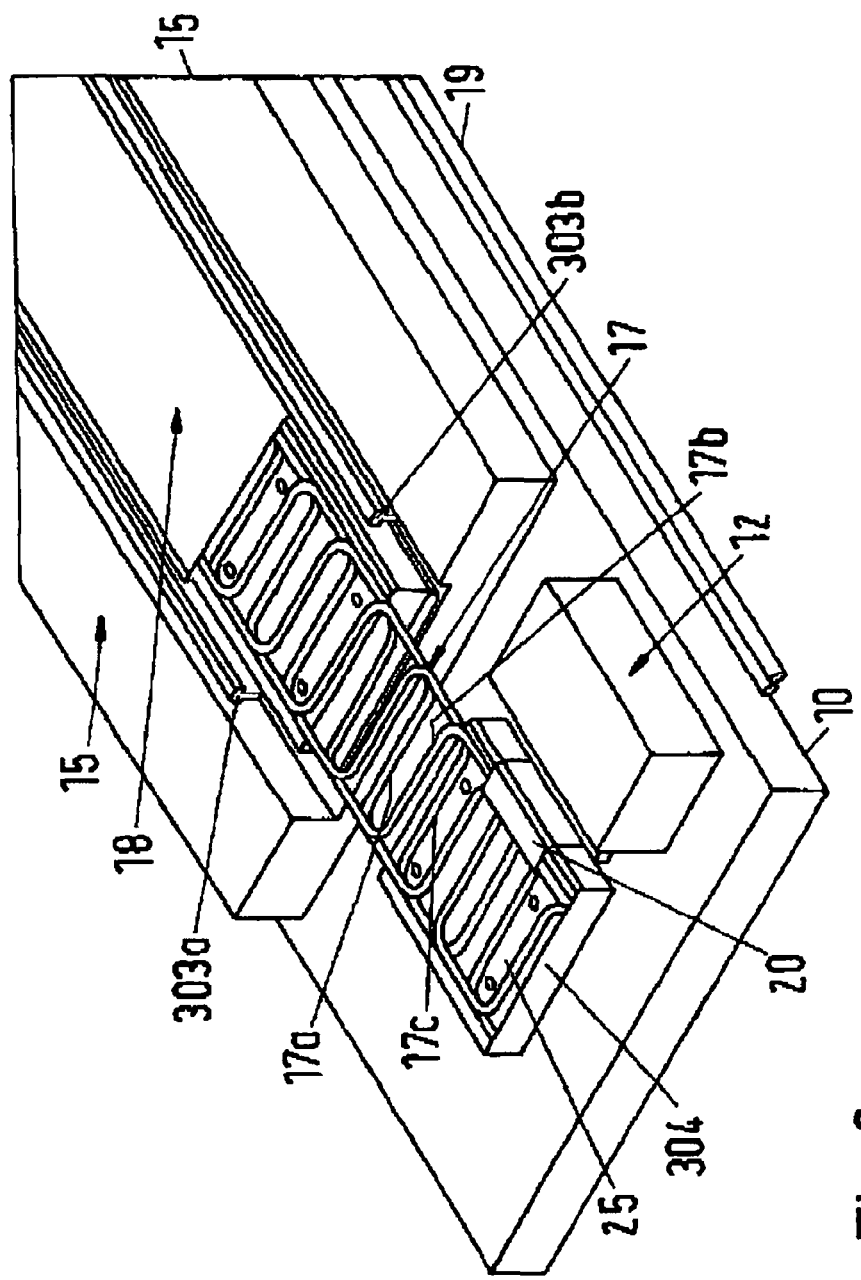
FIG. 6 shows a perspective view of a track construction similar to the construction shown in FIG. 5.

FIG. 6 shows a perspective view of a similar arrangement. The same or corresponding parts in FIGS. 5 and 6 are denoted by the same reference numerals.

FIG. 6 shows three cables 17a, 17b, 17c which are placed in recesses of block 304 to follow a meandering path. The recesses in block 304 and following blocks are not shown in detail. In order to increase visibility, some regions of the track construction are cut away in FIG. 6.

Coming back to the common features of the constructions shown in FIGS. 5 and 6, the track comprises a bottom layer 10 which is placed on a sublayer 35. The sublayer 35 may be natural ground or compressed ground or compressed construction material for example. The bottom layer 10 is preferably made of concrete. The bottom layer 10 may have a U-shaped cross section as shown in FIG. 5 or may be rectangular as shown in FIG. 6.

On top of the bottom layer 10, a intermediate layer 15 is placed into which the rails 303 together with the parts in between the rails 303 are embedded. The rails 303 are embedded between two lateral zones of fastening materiel, for example an elastomer, such as polyurethane. The inner zone between the rail 303 and the block 304 is denoted by 336a, 336b. The outer zone 335 of fastening material is located between the rail 303 and the layer 15 (in the lower region of the rail 303) and between the rail and a cover layer 340 (in the upper region of the rail 303). The cover layer 314 is an optional layer.

Alternatively or in addition, a cover 18 can be provided to cover the electric lines and the shaped blocks 304 (as shown in FIG. 6).

Further optional elements of the track construction are: A layer 341 which is arranged under the shaped block 304 and which may be made of fibre reinforced concrete (FIG. 5). A further layer 345 may be placed under the layer 341 (if present) or under block 304. This further layer 345, for example a met, may comprise electrically conducting material. This layer 345 can be used for shielding the electromagnetic field produced by the elect is lines in the recesses of the block 304. Also, the layer can be used as an electric contact point for providing electric ground potential.

As shown in FIG. 6, a structure 12 can be arranged sideways of the rails for containing electric and/or electronic devices for operation of the electric lines 17. The devices within the structure 12 are connected to the electric lines 17 via a connection device 20. Cables 19 for supplying electric energy to the device or devices within structure 12 are laid along the track construction parallel to the direction of travel of the vehicle.

The invention claimed is:

1. An arrangement comprising:
   at least one shaped block for positioning and/or holding a plurality of line sections of one or more electric lines along a drive way of a vehicle, wherein the shaped block comprises a plurality of recesses and/or projections, wherein edges of the recesses and/or the projections each delimit a space for the line sections into which one of the line sections can be introduced, so that said line section extends through the space in a longitudinal direction of the space, and wherein the longitudinal directions of the spaces delimited by the edges of the recesses and/or by the projections extend essentially mutually parallel in a common plane, and
   the line sections which extend through the spaces, wherein at least part of the line sections are formed by a continuous electric line so that first line sections extending through the spaces in a transverse direction relative to the drive way of the vehicle are mutually connected via second line sections of the electric line extending along the drive way of the vehicle, and
   wherein the second line sections extend alternately at opposing sides of the shaped block, so that the electric line follows a meandering path.

2. The arrangement according to claim 1, the at least one shaped block further comprising an end surface for facing in a direction of travel of the vehicle, wherein the end surface comprises a central region and wherein the end surface when viewed from above—retreatingly extends on both sides of the central region, so that a further shaped block having a plane or retreatingly extending end surface may abut on the end surface oriented in different directions.

3. The arrangement according to claim 1, wherein the recesses extend with their longitudinal directions substantially mutually parallel at an upper surface of the shaped block.

4. The arrangement according to claim 1, the at least one shaped block further comprising at least two of the shaped blocks, wherein the at least two shaped blocks are arranged behind one another to be positioned along the drive way.

5. The arrangement according to claim 2, wherein a first shaped block comprises a protrusion in the central region of the end surface, wherein a second shaped block comprises a recess in the central region of an abutting end surface, wherein the protrusion and the recess are correspondingly shaped and arranged so that the protrusion engages the recess in a manner which allows for a variation of the relative orientation of the first and second shaped block.

6. The arrangement of claim 5, wherein the protrusion and the recess—when viewed from above—comprise a curved outline.

7. The arrangement according to claim 1, wherein a plurality of the shaped blocks is arranged behind one another along the drive way of the vehicle so that the longitudinal directions of the spaces formed by the different shaped blocks for accommodating the line sections extend essentially mutually parallel.

8. The arrangement according to claim 7, wherein the shaped blocks arranged behind one another are situated between the rails of a railway track for railway vehicles, so that the longitudinal direction of the spaces for accommodating the line sections extend in an essentially horizontal plane and transversely to the drive way of the vehicle.

9. A method for positioning and/or holding a plurality of line sections of one or more electric lines along a track of a vehicle, wherein
   at least one shaped block having a plurality of recesses and/or projections is provided, wherein edges of the recesses and/or the projections each delimit a space for the line sections into which one of the line sections is introduced, so that said line section extends through the space in a longitudinal direction of the space, and wherein the longitudinal directions of the spaces delimited by the edges of the recesses and/or by the projections extend essentially mutually parallel in a common plane, and
   at least one electric line is introduced into the spaces such that first line sections of the electric line extend through the spaces in the longitudinal direction of the spaces,
   wherein the line or lines are introduced into the spaces such that at least part of the line sections are formed by a continuous electric line so that the first line sections extending through the spaces in a transverse direction relative to a drive way of the vehicle are mutually connected via other second line sections of the electric line extending along the drive way of the vehicle, and wherein the second line sections extend alternately at opposing sides of the shaped block, so that the electric line follows a meandering path.

10. The method according to claim 9, wherein the shaped block comprises an end surface for facing in a direction of travel of the vehicle, wherein the end surface comprises a central region and wherein the end surface—when viewed from above—retreatingly extends on both sides of the central region and wherein a further shaped block having a plane or retreatingly extending end surface is oriented in a desired direction—corresponding to the path of travel of the vehicle—while the end surfaces of the shaped block and of the further shaped block abutting on each other.

11. The method according to claim 10, wherein the shaped block comprises a protrusion in the central region of the end surface, wherein the further shaped block comprises a recess in the central region of an abutting end surface, wherein the protrusion and the recess are correspondingly shaped and wherein the shaped block and the further shaped block are arranged so that the protrusion engages the recess in a manner which allows for a variation of the relative orientation of the first and second shaped block.

* * * * *